United States Patent
Chen et al.

(10) Patent No.: US 12,150,171 B2
(45) Date of Patent: Nov. 19, 2024

(54) MECHANISMS TO ENABLE PEER-TO-PEER (P2P) SENSING

(71) Applicant: Intel Corporation, Santa Clara, CA (US)

(72) Inventors: Cheng Chen, Camas, WA (US); Bahareh Sadeghi, Portland, OR (US); Claudio da Silva, Portland, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 17/454,724

(22) Filed: Nov. 12, 2021

(65) Prior Publication Data

US 2022/0150962 A1 May 12, 2022

Related U.S. Application Data

(60) Provisional application No. 63/112,934, filed on Nov. 12, 2020.

(51) Int. Cl.
*H04W 74/0808* (2024.01)
*H04B 7/06* (2006.01)
*H04W 84/12* (2009.01)

(52) U.S. Cl.
CPC ...... *H04W 74/0808* (2013.01); *H04B 7/0626* (2013.01); *H04W 84/12* (2013.01)

(58) Field of Classification Search
CPC . H04W 74/0808; H04W 84/12; H04B 7/0626

USPC ......................................................... 370/338
See application file for complete search history.

(56) References Cited

U.S. PATENT DOCUMENTS

| 10,986,600 | B1* | 4/2021 | Chu | G01S 5/021 |
| 2017/0302417 | A1* | 10/2017 | Chun | H04L 1/0025 |
| 2018/0070296 | A1* | 3/2018 | Srikanteswara | H04W 36/0088 |
| 2022/0070710 | A1* | 3/2022 | Lim | H04W 72/04 |
| 2023/0318721 | A1* | 10/2023 | Lopez | H04L 1/0026 370/329 |

* cited by examiner

*Primary Examiner* — Kwang B Yao
*Assistant Examiner* — Syed M Bokhari
(74) *Attorney, Agent, or Firm* — Eversheds Sutherland (US) LLP

(57) ABSTRACT

This disclosure describes systems, methods, and devices related to peer-to-peer (P2P) Wi-Fi sensing. A device may generate a request to perform P2P Wi-Fi sensing operations with a second non-AP STA; send the request to an AP to which the non-AP STA is associated; identify a response received from the AP, the response indicating that the non-AP STA is a sensing receiver for the P2P Wi-Fi sensing operations; identify a trigger frame received from the AP, the trigger frame associated with the P2P Wi-Fi sensing operations; identify a sensing physical layer (PHY) protocol data unit (PPDU) received from the second non-AP STA, the sensing PPDU associated with the P2P Wi-Fi sensing operations and including an indication that the second non-AP STA sent the sensing PPDU; and determine channel state information based on the sensing PPDU, the channel state information indicative of motion of people or objects.

20 Claims, 14 Drawing Sheets

MECHANISMS TO ENABLE PEER-TO-PEER (P2P) SENSING

CROSS-REFERENCE TO RELATED APPLICATION(S)

This application claims the benefit of U.S. Provisional Application No. 63/112,934, filed Nov. 12, 2020, the disclosure of which is incorporated herein by reference as if set forth in full.

TECHNICAL FIELD

This disclosure generally relates to systems and methods for wireless communications and, more particularly, to mechanisms to enable peer-to-peer (P2P) sensing.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
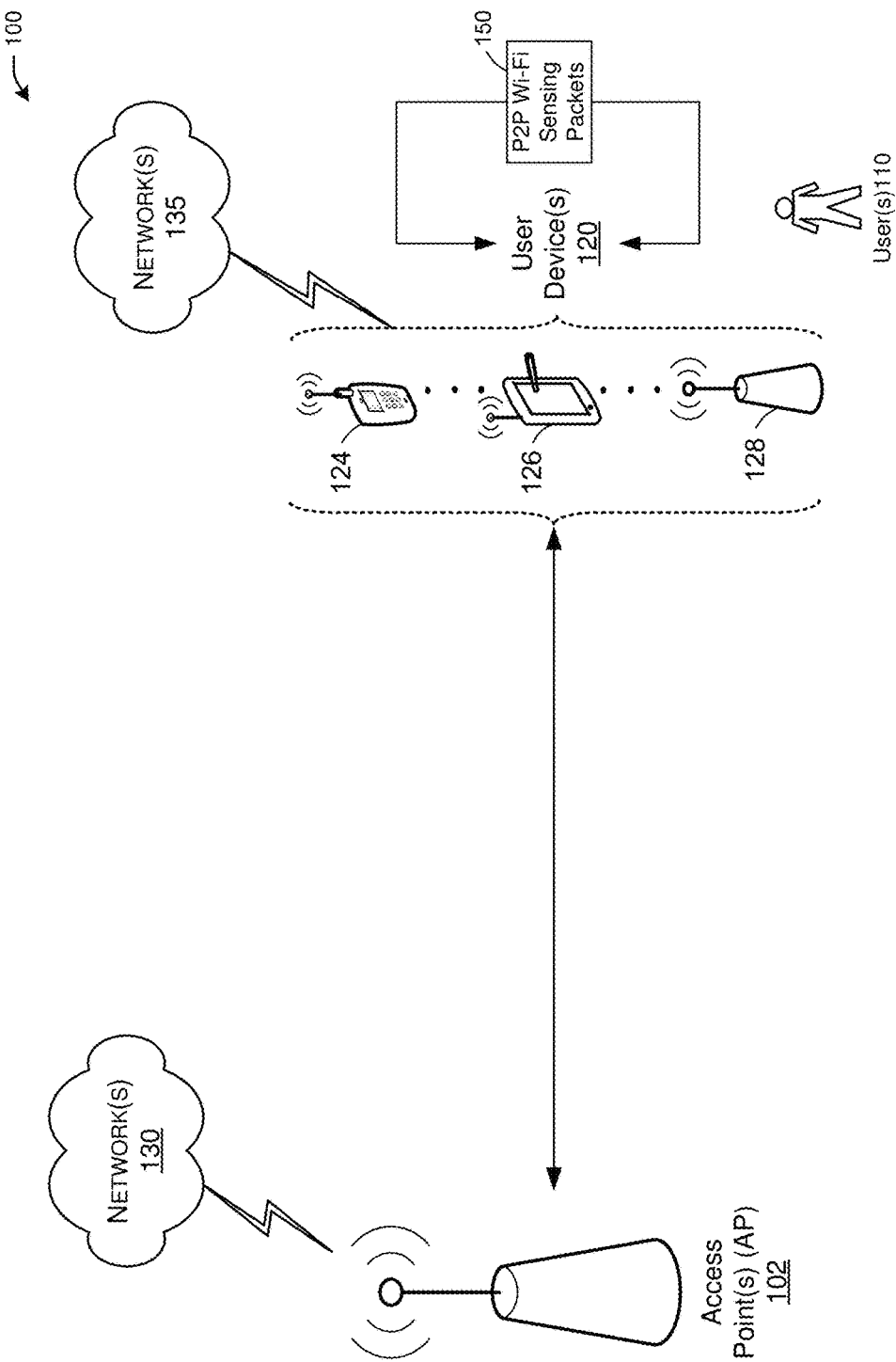
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.11 family of standards provides the technology for Wi-Fi communications, and the IEEE 80211bf standard is being defined for wireless local area network (WLAN) sensing. The IEEE 80211bf standard will allow station devices (STAs) to communicate their WLAN sensing capabilities to other STAs and to establish transmissions that allow for the performance of WLAN channel sensing measurements. Wi-Fi sensing is a term given to technologies that use traditional Wi-Fi to perform radar-like applications such as detecting motion in a room. Wi-Fi sensing allows for motion detection, gesture recognition, and biometric measurements using Wi-Fi signals. Sensing is performed by tracking channel estimates obtained with multiple Wi-Fi packets (e.g., physical layer protocol data units—PPDUs) over time, and detecting changes that may indicate an event of interest (e.g., whether motion is present).

In Wi-Fi sensing (or wireless local area network sensing—WLAN sensing), sensing (e.g., motion sensing) may be performed by tracking changes/variations in channel estimates obtained with multiple Wi-Fi packets over time—which could have been sent by one or more devices—and detecting patterns that indicate an event of interest, such as motion in a room. For example, channel state information (CSI) may refer to information that characterizes the propagation of wireless signals from a transmitter to a receiver at different carrier frequencies. A channel frequency response (CFR) may represent a CSI entry, including an amplitude and phase of a wireless signal. CSI may be based on the carrier frequency (e.g., different carrier frequencies may have different CFRs), propagation delay, and an amplitude attenuation factor. A CSI amplitude and phase may be affected by movements of transmitter and/or receiver devices, objects, and people. As such, when a CSI (e.g., a CFR) varies over time, such may indicate the presence and motion of people or objects. In this manner, the variance of CSI channel measurements for a communication link over time may indicate the presence of motion.

Some existing Wi-Fi sensing techniques focus on sensing activities between an access point (AP) and a station device (STA), assuming one of them transmits sensing physical layer (PHY) protocol data units (PPDUs), and the other receives sensing PPDUs. However, some existing techniques may not enable Wi-Fi sensing between two non-AP STAs, for example, enabling peer-to-peer (P2P) Wi-Fi sensing such that one non-AP STA transmits sensing PPDUs and the other non-AP STA receives sensing PPDUs.

In this disclosure, mechanisms are proposed to facilitate P2P Wi-Fi sensing between non-AP STAs, providing scenarios where P2P sensing occurs within a same basic service set (BSS), for example, a pair having a non-AP STA sensing transmitter and a non-AP STA sensing receiver may associated to a same AP. The present disclosure also facilitates scenarios in which P2P sensing occurs between two non-AP STAs across two different BSSs.

Example embodiments of the present disclosure relate to systems, methods, and devices for peer-to-peer (P2P) Wi-Fi sensing.

In one or more embodiments, a P2P sensing system may address P2P sensing to enable sensing physical layer (PHY) protocol data unit (PPDU) transmission and reception between a non-AP STA and another non-AP STA within the same BSS and across different BSSs. During a negotiation phase, the AP may identify if there is going to be sensing transmission and reception between two non-AP STAs. If there will be such a P2P sensing exchange, the AP may determine which STA would be the transmitter, and which would be the receiver. For the sensing session, the AP may send a trigger frame to trigger the sensing transmitter STA to transmit broadcast null data packets (NDPs), while the sensing receiver STA may be listening for the NDP packets to perform sensing measurements. When there is a need for the sensing receiver STA to feed back the sensing measurement results to the sensing transmitter STA, there are multiple options: (1) The AP may transmit a trigger frame to solicit the feedback from the sensing receiver STA, and then the AP forwards the feedback to the sensing transmitter STA; (2) the AP may schedule a triggered P2P allocation for the sensing receiver STA to directly send the feedback to the sensing transmitter STA.

In one or more embodiments, when the P2P sensing transmission and reception occur between two non-AP STAs that are in different BSSs, additional signaling and information may be exchanged between the two APs which the two non-AP STAs are associated, enabling the sensing transmissions across two BSSs.

In one or more embodiments, a P2P sensing system may enable P2P sensing so that sensing transmission and reception may happen between two non-AP STAs. This would be enable use cases where a client initiates Wi-Fi sensing and performs sensing transmission and reception with other clients.

In one or more embodiments, the trigger frames sent by the AP may use multiple options. The 802.11 standard (e.g., 802.11az) defines a way to differentiate between trigger frame subtypes by using signaling in a Trigger Dependent Common Information subfield of a trigger frame (e.g., found within the Common Information field of a trigger frame). The type of trigger frame sent by an AP may be indicated by the Trigger Dependent Common Information subfield. One trigger frame variant is a ranging trigger frame. Within a trigger frame variant, a subtype subfield may indicate how the trigger frame variant is used. For example, a ranging trigger frame variant subfield may indicate whether the ranging trigger frame variant is a polling trigger frame, a sounding trigger frame, a secure sounding trigger frame, a reporting trigger frame, or a passive trigger-based sounding trigger frame. Using an available bit from the ranging trigger subtype subfield, a trigger frame may be indicated as a sensing trigger frame. Alternatively, the trigger frame may be a new variant (e.g., different than the ranging trigger frame variant), for example, a sensing trigger frame used to schedule the P2P Wi-Fi sensing operations between the two STAs. The Trigger Dependent Common Information subfield may indicate the subtype, sounding dialog token number, and the like for the new trigger frame variant.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, according to some example embodiments of the present disclosure. Wireless network XX00 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
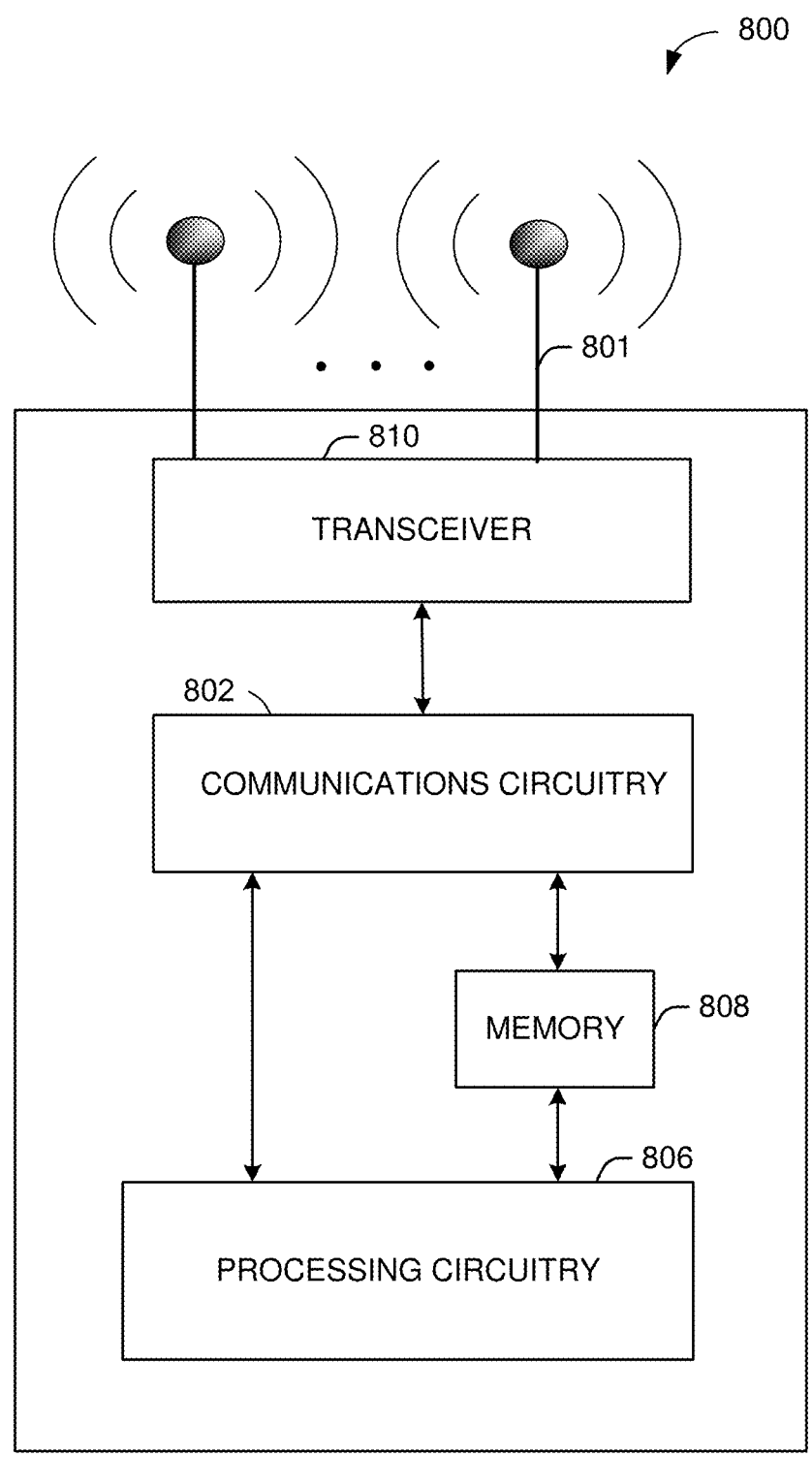
FIG. 8 illustrates a functional diagram of an exemplary communication station that may be suitable for use as a user device, in accordance with one or more example embodiments of the present disclosure.
Figure 9:
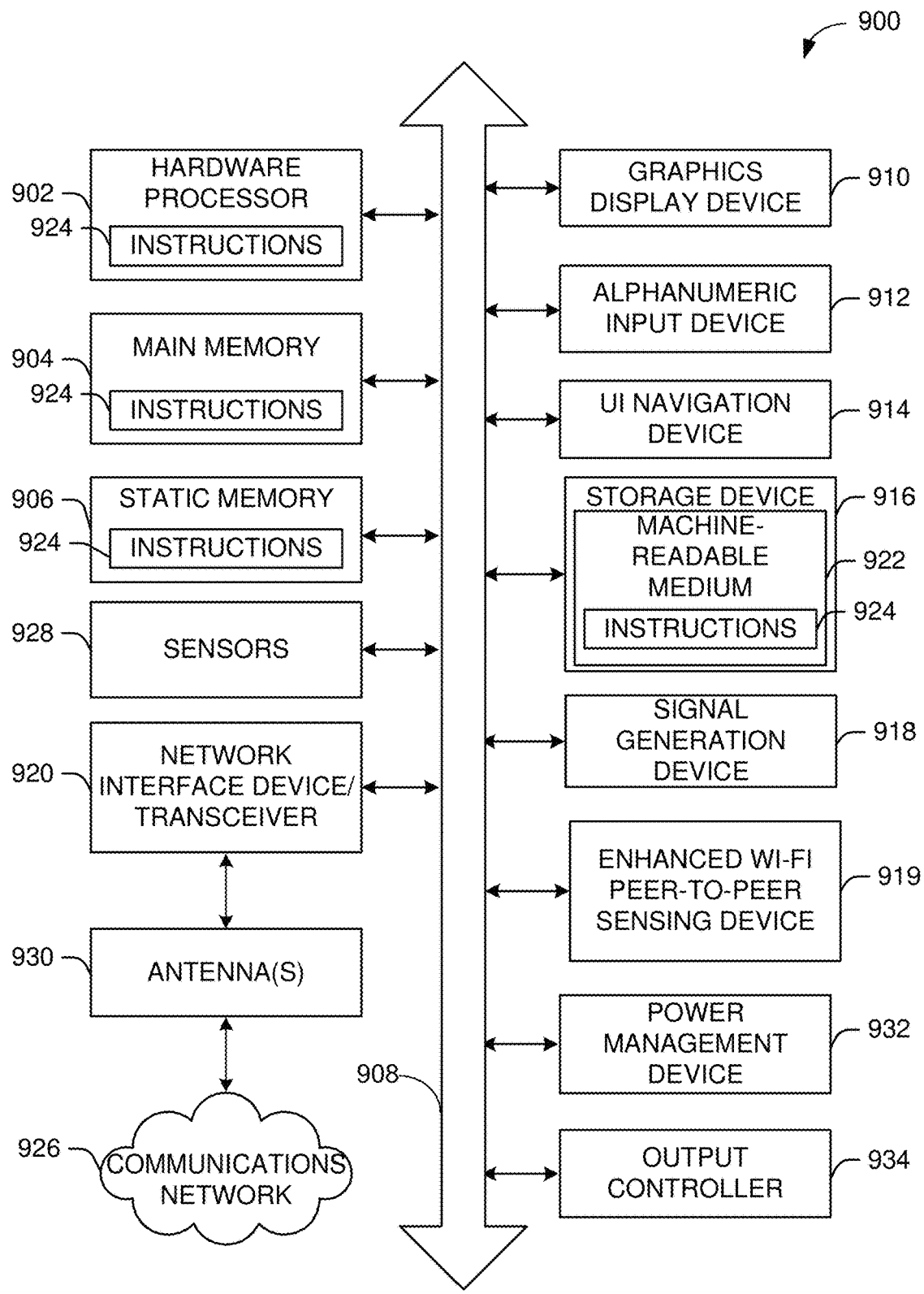
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), 60 GHZ channels (e.g. 802.11ad, 802.11ay, 802.11bf), and/or 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, one more of the APs 102 may facilitate P2P sensing between multiple of the one or more user devices 120. In particular, one more of the APs 102 may negotiate the transmitter and receiver of the one or more user devices 120, allowing the one or more user devices 120 to perform P2P Wi-Fi sensing between them. For example, any two of the one or more user devices 120 may perform P2P Wi-Fi sensing by sending P2P Wi-Fi sensing packets 150 (e.g., as described further herein) to each other to perform Wi-Fi sensing operations. The two of the one or more user devices 120 that perform Wi-Fi sensing operations may belong to a same BSS (e.g., a same AP of the one or more APs 102) or to different APs (e.g., the one or more APs 102 include two APs, and each of the two of the one or more user devices 120 belong to different respective APs of the two APs).

It is understood that the above descriptions are for purposes of illustration and are not meant to be limiting.

Figure 2:
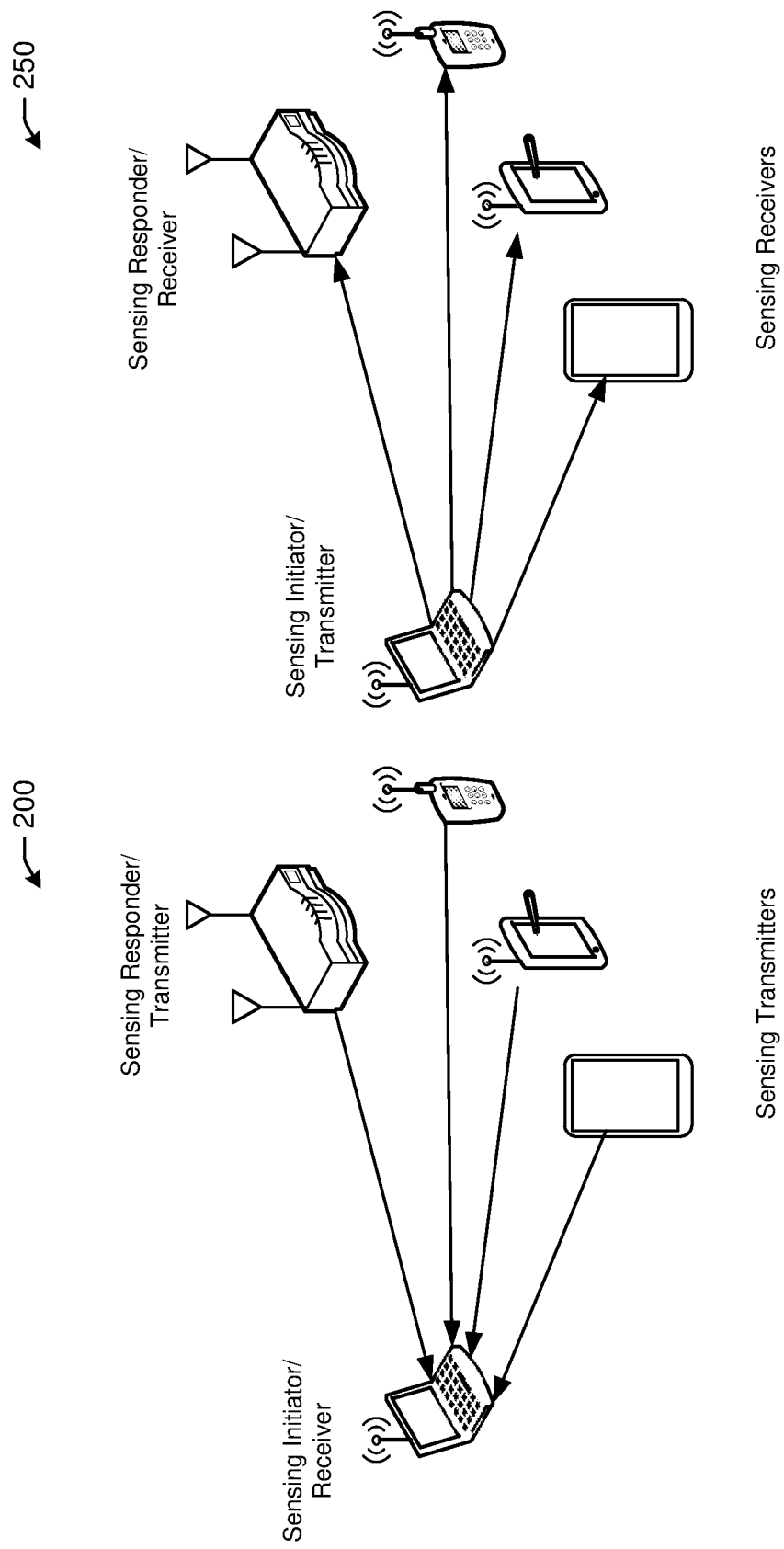
FIG. 2 depicts illustrative schematic diagrams for Wi-Fi peer-to-peer (P2P) sensing, in accordance with one or more example embodiments of the present disclosure.

FIG. 2 depicts illustrative schematic diagrams for Wi-Fi P2P sensing, in accordance with one or more example embodiments of the present disclosure.

Referring to FIG. 2, schematic diagram 200 and schematic diagram 250 show P2P sensing scenarios within the same BSS. Schematic diagram 200 depicts the sensing initiator as the sensing receiver. Schematic diagram 250 depicts the sensing initiator as the sensing transmitter.

In one or more embodiments, a P2P sensing system may facilitate the following procedures to enable the P2P sensing use case illustrated in FIG. 2. A sensing procedure allows a STA to perform WLAN sensing and obtain measurement results. A sensing session is an instance of a sensing procedure with the associated scheduling if applicable, and operational parameters of that instance. Regarding sensing initiator and sensing responder(s): Sensing initiator may refer to a STA that initiates a WLAN sensing session. Sensing responder may refer to a STA that participates in a WLAN sensing session initiated by a sensing initiator. Regarding sensing transmitter(s) and sensing receiver(s): Sensing transmitter may refer to a STA that transmits PPDUs used for sensing measurements in a sensing session. Sensing receiver may refer to a STA that receives PPDUs sent by a sensing transmitter and performs sensing measurements. In a sensing session, there is one sensing initiator, one or more sensing responders, one or more sensing transmitters, and one or more sensing receivers. A STA may assume multiple roles in one sensing session.

In one or more embodiments, during a negotiation phase, the sensing initiator, which is a non-AP STA, initiates sensing negotiation with the associated AP. The sensing initiator indicates its intent to perform sensing not only with the AP, but also with other non-AP STAs in the same BSS. The sensing initiator STA and sensing responder AP negotiate and agree on participants that will be involved in sensing activities. The sensing responder AP informs the sensing initiator STA which other non-AP STAs will be included in the sensing by indicating the association identifiers (AIDs) of those non-AP STAs in the agreed negotiation. The sensing initiator and responder identify whether sensing initiator would be the sensing transmitter schematic diagram 250) or sensing receiver (schematic diagram 200). The sensing initiator and responder agree on the scheduling information allocated for sensing transmission and reception.

In one or more embodiments, a sensing transmission and reception phase may include the use of sensing PPDUs (e.g., the Wi-Fi P2P sensing packets 150 of FIG. 1). Sensing PPDUs may be null data packets (NDPs), referring to packets without a medium access control (MAC) payload, or they may be packets with a MAC payload. Sensing PPDUs may be broadcast, in which case the receiver address (RA) is set to the Broadcast Address, or it may be unicast with the RA set to the intended recipient.

In one or more embodiments, if a sensing initiator STA is the sensing receiver, as in the schematic diagram 200: When it comes to the corresponding negotiated sensing session, the AP transmits a sensing PPDU to the STA. The AP also sends Trigger frame(s) to the other non-AP STAs that are identified as sensing transmitters to trigger them to send sensing PPDUs. Regarding the choice of such Trigger frame, there are multiple options: One option is that the Trigger frame can be adapted from the existing Ranging Trigger frame defined in 802.11az, and a new subtype may be created under the Ranging Trigger frame type (a "Sensing Trigger frame"). Once transmitted, the recipient STA is triggered to transmit broadcast NDP packets after short inter frame space (SIFS) time of the Trigger frame reception. In this case, there is no need to identify the recipient of the sensing PPDU transmission as the NDP packets are already broadcast. Table 1 below shows example Ranging Trigger frame variants and how they are indicated (e.g., using the Ranging Trigger subtype field.

TABLE 1

Ranging Trigger Frame Variants:

| Ranging Trigger Subtype field value | Ranging Trigger frame variant |
|---|---|
| 0 | Poll |
| 1 | Sounding |
| 2 | Secure Sounding |
| 3 | Report |
| 4 | Passive TB Sounding |
| 5 | Sensing |
| 6-15 | Reserved |

As shown in Table 1, the Ranging Trigger frame includes a Ranging Trigger frame subtype field whose bits indicate the Ranging Trigger frame variant. Currently, bits 0-4 indicate Ranging Trigger variants, but the Ranging Trigger subtype field does not indicate a sensing Ranging Trigger frame variant. One or more bits (e.g., bit 5 or another available bit) of the Ranging Trigger subfield may be used to indicate that the trigger frame sent is a sensing variant of the Ranging Trigger frame.

In one or more embodiments, another Trigger frame option is to implement a new Trigger variant, called for example a "Sensing Trigger frame" that is used to schedule Triggered P2P transmission between two non-AP STAs. The Trigger Dependent Common Info field of a Trigger frame may be used to include necessary information for this Trigger frame, for example, the different subtypes of the Sensing Trigger and Sounding Dialog Token number, etc. In this case, the AP needs to identify the recipient STA, which is the sensing initiator STA, in the Trigger frame so that the sensing transmitter may identify which device to which it will transmit. For example, Table 2 below shows the Trigger Type subfield values of a Trigger frame used to indicate the Trigger frame variant represented by the Trigger frame, and Table 3 shows an example Sensing Trigger subtype field used when the Trigger frame variant is a Sensing Trigger frame.

TABLE 2

Trigger Frame Variants:

| Trigger Type subfield value | Trigger frame variant |
|---|---|
| 8 | Ranging |
| 9 | Sensing |
| 10-15 | Reserved |

TABLE 3

Trigger Type Subfield for Sensing Trigger Frame:

| | Sensing Trigger Subtype | Reserved | Reserved | Sounding Dialog Token Number |
|---|---|---|---|---|
| Bits | 4 | 4 | 2 | 6 |

In one or more embodiments, regarding the choice of how to trigger multiple non-AP STAs to transmit to the sensing receiver, there are multiple options. One option is to enable the Trigger frame to trigger multiple STAs simultaneously so that the AP sends one Trigger frame to all sensing transmitters at the same time. Another option allows the AP to send multiple Trigger frames to each of the transmitters sequentially.

In one or more embodiments, in the transmitted sensing PPDU (including the NDP), the transmitter includes some form of STA ID in the PHY header, for example, the STA AID, to clearly indicate the transmitter of the sensing PPDU.

In one or more embodiments, a sensing receiver STA may listen for the sensing PPDU and performs measurements based on the received sensing PPDU. Because the sensing PPDU includes the STA ID of the transmitter, the sensing receiver STA may be able to identify to which transmitter the received PPDU belongs.

Figure 3:
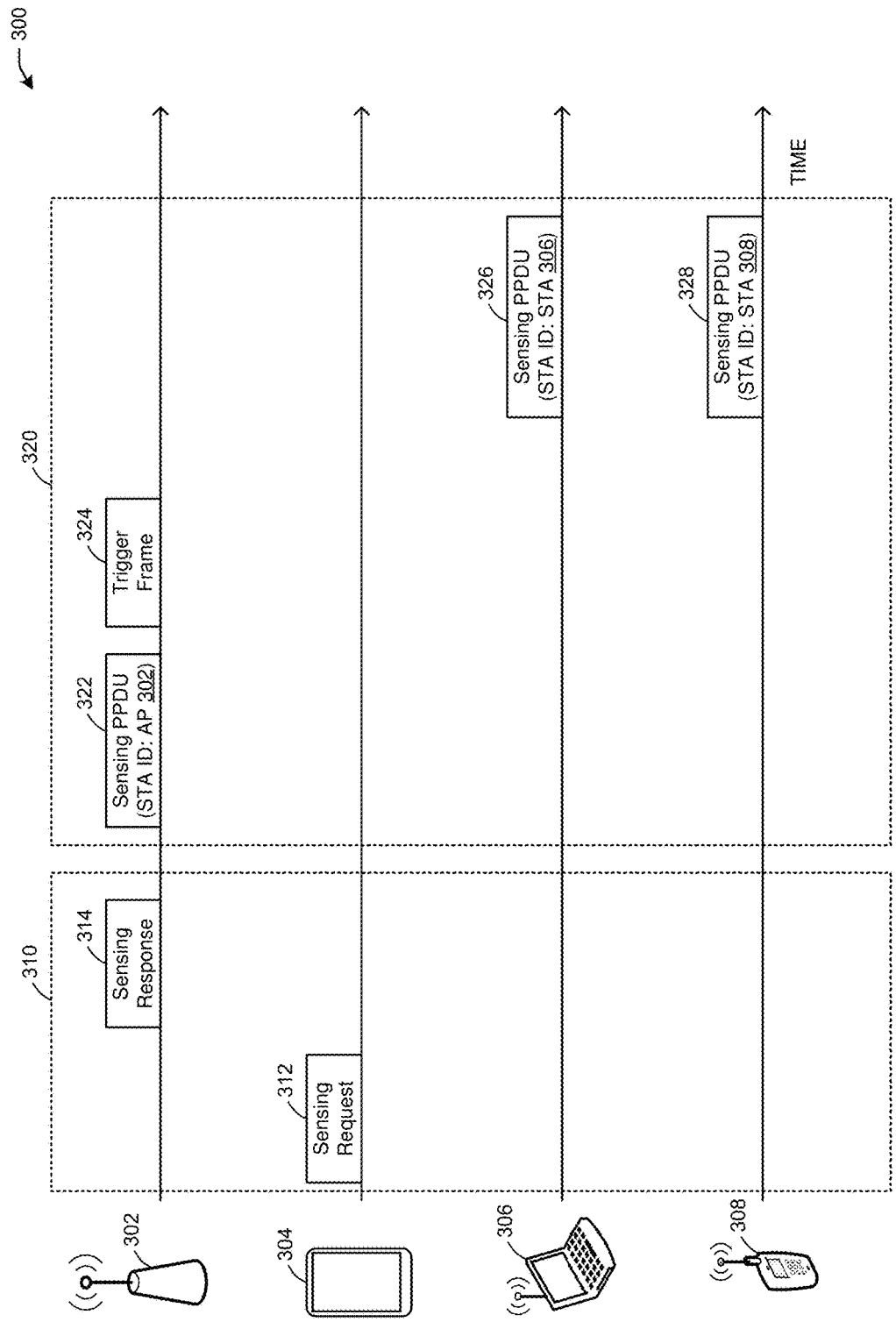
FIG. 3 depicts a P2P Wi-Fi sensing process, in accordance with one or more aspects of the present disclosure.

FIG. 3 depicts a P2P Wi-Fi sensing process 300, in accordance with one or more aspects of the present disclosure.

Referring to FIG. 3, the P2P Wi-Fi sensing process 300 represents a scenario in which a STA is both the sensing initiator and sensing receiver. As shown, an AP 302 interacts with (e.g., forms a BSS with) one or more user devices (e.g., STA 304, STA 306, STA 308). The STA 304 is shown as both the sensing initiator and sensing receiver. During a negotiation phase 310, the STA 304 may send a sensing request 312 to the AP 302, which responds by sending a sensing response 314. The exchange during the negotiation phase allows the AP 302 to determine which device will be a sensing transmitter and/or sensing receiver for P2P Wi-Fi sensing operations. During a sensing transmission and reception phase 320, the AP 302 may send a sensing PPDU 322 with the STA identifier indicating the AP 302, and subsequently may send a trigger frame 324 to trigger the other user devices that did not send the sensing request 312 (e.g., STA 306 and STA 308) to send sensing PPDUs. For example, the STA 306 may send a sensing PPDU 326 having an STA identifier indicating the STA 306, and the STA 308 may send a sensing PPDU 328 having an STA identifier indicating the STA 308. In this manner, the AP 302 may facilitate P2P Wi-Fi sensing exchanges between the user devices by sending the trigger frame 324 to all sensing transmitters at the same time to trigger multiple simultaneous sensing PPDUs to be sent. In the sensing PPDUs shown, the STA identifiers may be included in PHY headers of the PPDUs, for example, to indicate the device that transmitted the respective sensing PPDU. The sensing receiver devices may listen for sensing PPDUs, and based on the received sensing PPDUs from other P2P devices, may perform Wi-Fi sensing measurements (e.g., using CSI data as described above).

Figure 4:
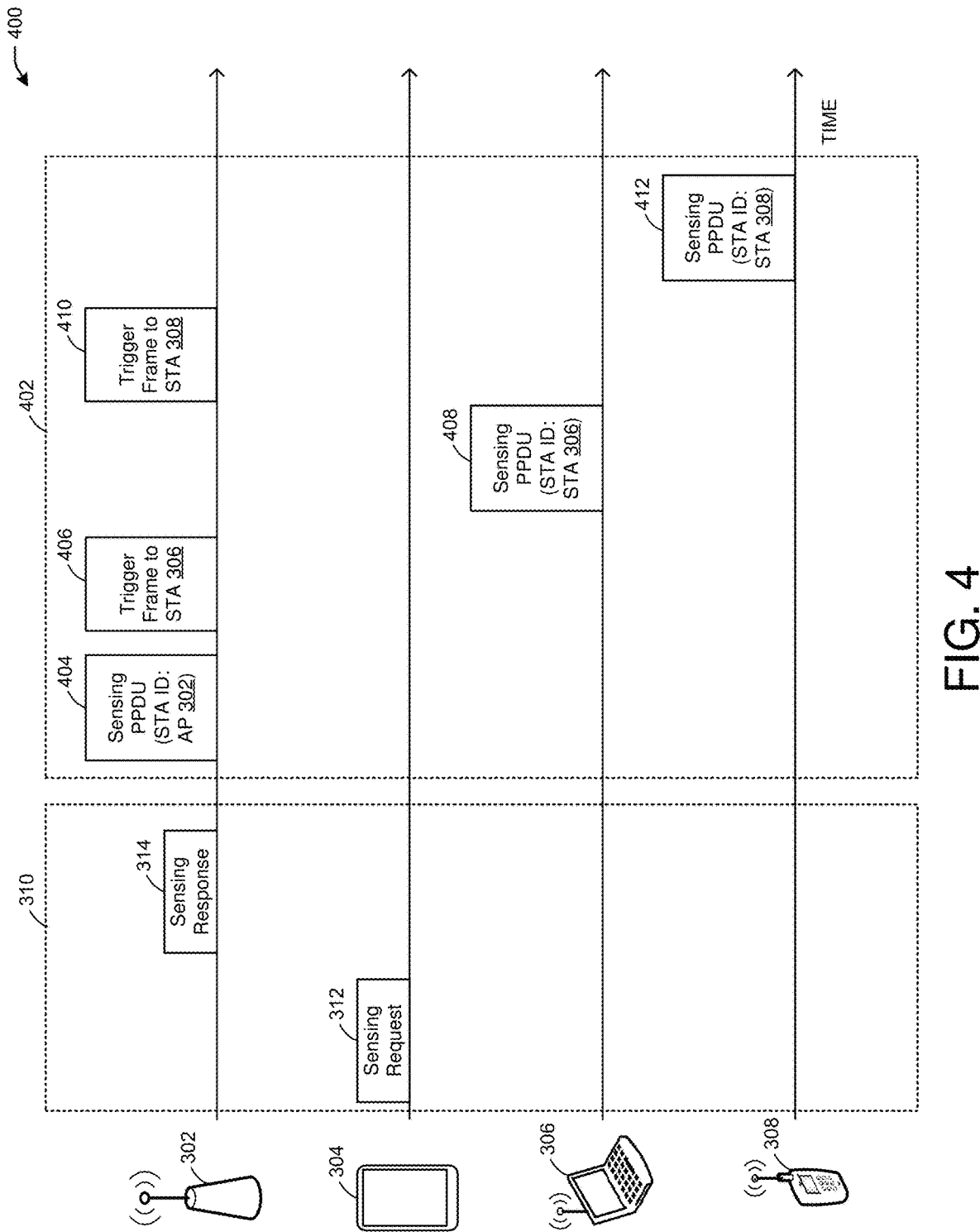
FIG. 4 depicts a P2P Wi-Fi sensing process, in accordance with one or more aspects of the present disclosure.

FIG. 4 depicts a P2P Wi-Fi sensing process 400, in accordance with one or more aspects of the present disclosure.

Referring to FIG. 4, the P2P Wi-Fi sensing process 400 represents a scenario in which a STA is both the sensing initiator and sensing receiver. While both FIGS. 3 and 4 show the same negotiation phase 310, FIG. 4 uses a different sensing transmission and reception phase 402 in which the Wi-Fi P2P sensing transmissions occur sequentially based on individually addressed trigger frames. For example, the AP 302 may send a sensing PPDU 404 with the STA identifier indicating the AP 302 as the sender, and then may send a trigger frame 406 addressed to the STA 306. Upon receiving the trigger frame 406, the STA 306 may identify an address of the STA 306 in the trigger frame 406 to indicate that the trigger frame 406 is intended for the STA 306. The STA 306 may respond by sending a sensing PPDU 408 having a STA identifier indicating the STA 306 as the sender. Subsequently, the AP 302 may send additional trigger frames to other STAs. For example, the AP 302 may send a trigger frame 410 addressed to the STA 308. Upon receiving the trigger frame 410, the STA 308 may identify an address of the STA 308 in the trigger frame 410 to indicate that the trigger frame 410 is intended for the STA 308. The STA 308 may respond by sending a sensing PPDU 412 having a STA identifier indicating the STA 308 as the sender. In this manner, the AP 302 may facilitate P2P Wi-Fi sensing exchanges between the user devices by sending different trigger frames individually to the sensing transmitters to trigger multiple sensing PPDUs to be sent sequentially. In the sensing PPDUs shown, the STA identifiers may be included in PHY headers of the PPDUs, for example, to indicate the device that transmitted the respective sensing PPDU. The sensing receiver devices may listen for sensing PPDUs, and based on the received sensing PPDUs from other P2P devices, may perform Wi-Fi sensing measurements (e.g., using CSI data as described above).

Referring to FIGS. 3 and 4, when the STA 304 is a sensing receiver, no sensing measurement feedback may be needed because the STA 304 is the sensing initiator and sensing receiver, therefore performing P2P Wi-Fi sensing measurements on its own with no need to provide feedback to another device to perform the measurements.

Figure 5:
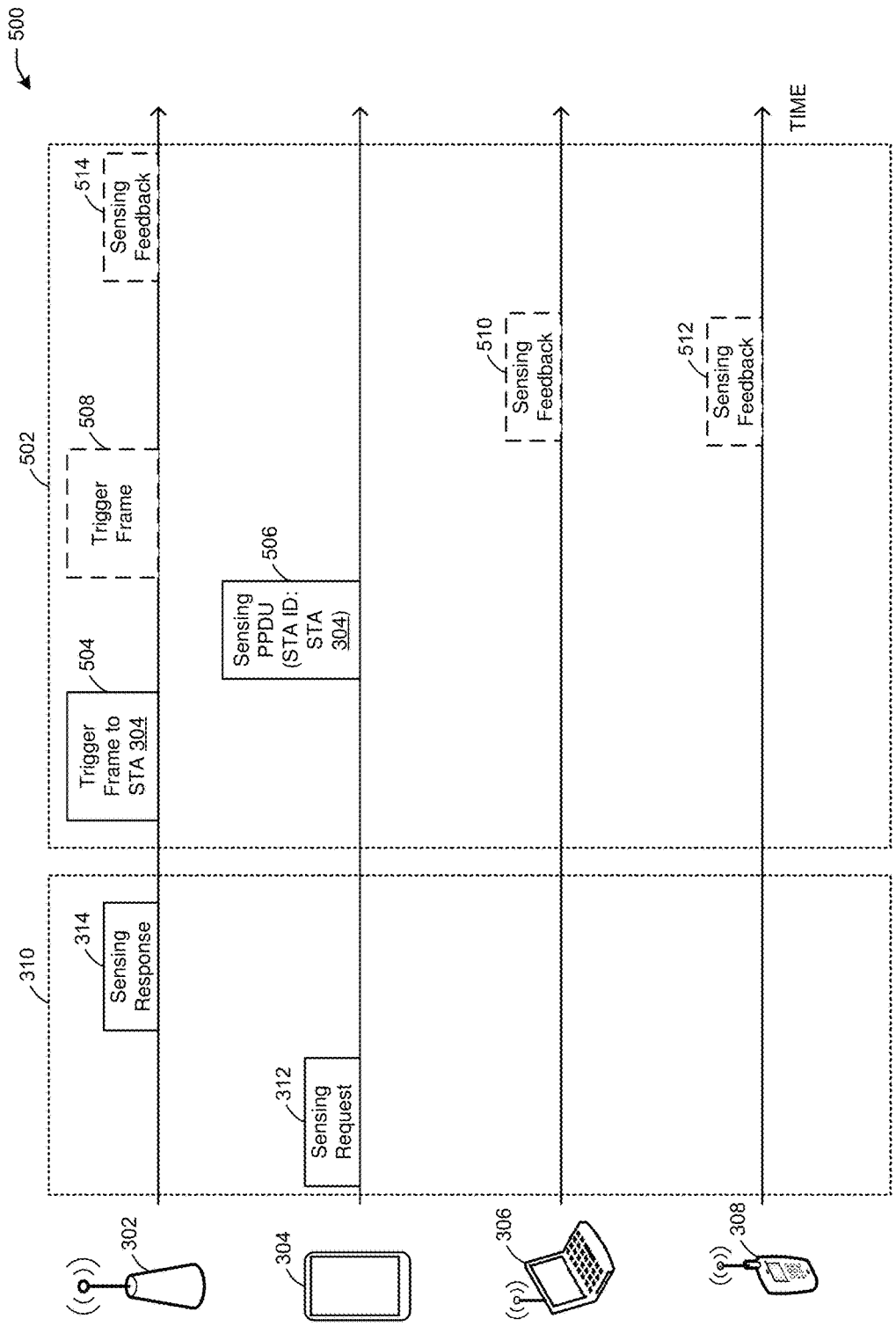
FIG. 5 depicts a P2P Wi-Fi sensing process, in accordance with one or more aspects of the present disclosure.

FIG. 5 depicts a P2P Wi-Fi sensing process 500, in accordance with one or more aspects of the present disclosure.

Referring to FIG. 5, the P2P Wi-Fi sensing process 500 represents a scenario in which a STA is both the sensing initiator and sensing transmitter. While both FIGS. 3-5 show the same negotiation phase 310, FIG. 5 uses a different sensing transmission and reception phase 502 in which the STA 304 is the sensing transmitter. The AP 302 may send a trigger frame 504 addressed to the STA 304. Upon receiving the trigger frame 504 and identifying the intended address of the STA 304, the STA 304 may broadcast a sensing PPDU 506 (e.g., send the sensing PPDU 506 to all nearby devices)

so that the other devices may receive the sensing PPDU 506 and perform Wi-Fi sensing based on the sensing PPDU 506. The sensing PPDU 506 may identify the sender as the STA 304. In this manner, the AP 302 may facilitate P2P Wi-Fi sensing exchanges between the user devices by sending a trigger frame individually to a sensing transmitter (e.g., the STA 304 as determined during the negotiation phase 310) to trigger a sensing PPDU to be broadcast by the sensing transmitter to the sensing receiver devices. In the sensing PPDUs shown, the STA identifiers may be included in PHY headers of the PPDUs, for example, to indicate the device that transmitted the respective sensing PPDU. The sensing receiver devices may listen for sensing PPDUs, and based on the received sensing PPDUs from other P2P devices, may perform Wi-Fi sensing measurements (e.g., using CSI data as described above).

Referring to FIG. 5, when the STA 304 is the sensing transmitter, there may be a need for the sensing receivers (e.g., the STA 306 and the STA 308) to provide sensing results to the initiator (e.g., the STA 304) as feedback. There are multiple feedback options. In one option, the AP 302 optionally may send a trigger frame 508 to the sensing receivers (e.g., the STA 306 and the STA 308) to trigger them to send sensing feedback 510 and sensing feedback 512 to the AP 302 or to the STA 304. When the trigger frame 508 triggers the sensing feedback to be sent to the AP 302, the AP 302 may send the feedback to the STA 304 on behalf of the STAs 306 and 308 (e.g., using sensing feedback 514). When the trigger frame 508 is used to trigger the sensing feedback to be sent to the STA 304 directly, the trigger frame 508 may schedule the transmissions of the sensing feedback 510 and the sensing feedback 512.

Referring to FIGS. 3-5, the P2P transmission period may be a single period with multi-user transmissions, or may include multiple sequential time periods for the respective initiator and receiver of the P2P Wi-Fi sensing operations.

Figure 6:
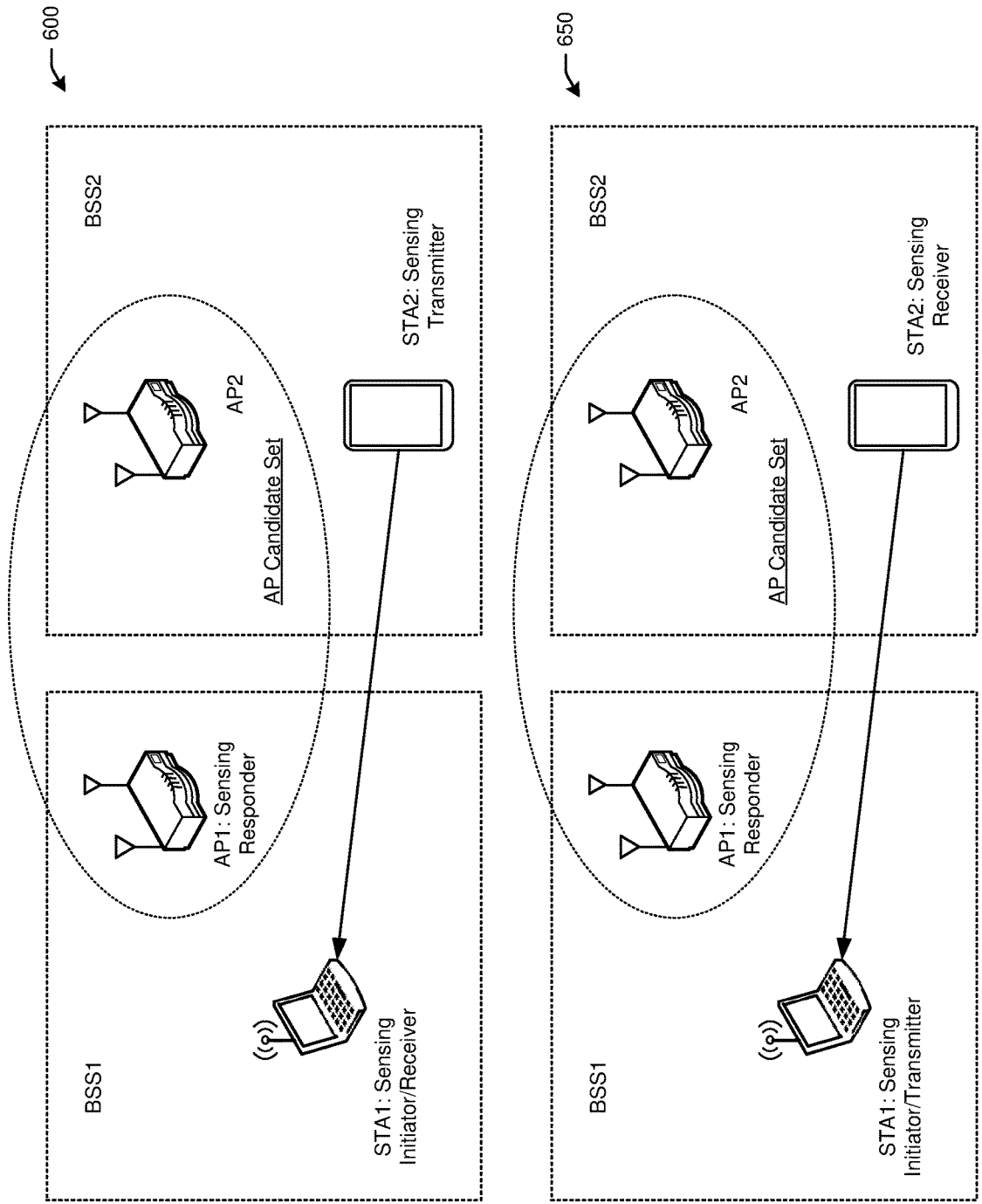
FIG. 6 depicts P2P Wi-Fi sensing operations between two non-access point stations in different respective basic service sets, in accordance with aspects of the present disclosure.

FIG. 6 depicts P2P Wi-Fi sensing operations between two non-AP STAs in different respective BSSs, in accordance with aspects of the present disclosure.

Referring to FIG. 6, P2P Wi-Fi sensing operations 600 show a sensing initiator as the sensing transmitter, and P2P Wi-Fi sensing operations 650 show a sensing initiator as the sensing receiver.

In one or more embodiments, to use P2P Wi-Fi sensing operations for non-AP STAs in different BSSs, the APs that provide the BSSs may use signaling and exchange information. For example, if STA1 initiates a sensing negotiation with AP1 and indicates intent to perform sensing with another non-AP STA in a different BSS, the two APs of the BSSs may be in the same AP candidate set (e.g., as defined by 802.11be), and may exchange information regarding each other's associated STAs (e.g., to indicate AIDs of the STAs in the other respective BSS). The two APs of the different BSSs may provide to its associated STAs the AP identifier of the other AP of the other BSS so that the associated STAs may identify the other AP in the same AP candidate set (e.g., the AP1 may provide AIDs of its associated STAs to the AP2 and vice versa). The AP1 may inform the AP2 of scheduling information of a sensing session for STA1 and STA2, allowing STA2 to determine when to expect to transmit to and receive sensing PPDUs from STA1. When STA1 is the transmitter, AP1 may send a trigger frame to trigger STA1 to send sensing PPDUs that include the STA identifier of STA1 and the AP identifier of AP1. When STA1 receives the sensing PPDU from STA1, STA2 may verify that the sensing PPDU was sent by STA1. The trigger frame may include the AID of STA2 if the sensing PPDU is unicast, allowing STA1 to identify to which device to transmit in response to the trigger frame, and may include the AID of STA2 if the sensing PPDU is broadcast.

In one or more embodiments, when STA1 is the receiver, AP2 sends a trigger frame to trigger STA2 to send sensing PPDUs. In the sensing PPDUs, the STA2 may include its STA AID and the AP identifier of AP2. In this manner, when STA 1 receives a sensing PPDU, STA1 may verify the sender as STA2. The trigger frame may include the AID of STA1 if the sensing PPDU is unicast to inform STA2 to which device to transmit, and may include the AID of STA1 when the sending PPDU is broadcast.

It is understood that the above descriptions are for purposes of illustration and are not meant to be limiting.

Figure 7A:
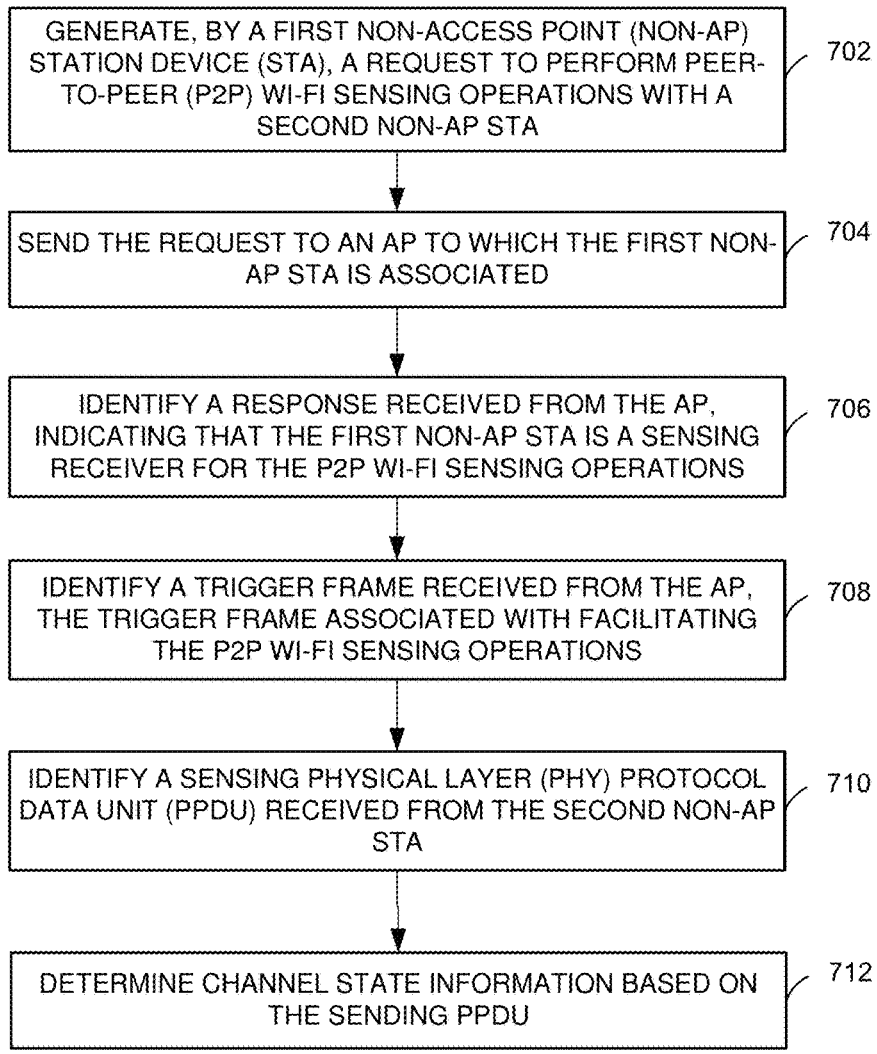
FIG. 7A illustrates a flow diagram of illustrative process for Wi-Fi P2P operations, in accordance with one or more example embodiments of the present disclosure.

FIG. 7A illustrates a flow diagram of illustrative process 700 for Wi-Fi P2P operations, in accordance with one or more example embodiments of the present disclosure.

At block 702, a device (e.g., the user device(s) 120 of FIG. 1, the STAs 1-4 of FIG. 2, the STA 304 of FIGS. 3 and 4) may generate a request to perform P2P Wi-Fi operations with a another non-AP STA.

At block 704, the device may send the request to an AP to which the device is associated (e.g., via a BSS). The request may be sent using a wireless medium.

At block 706, the device may identify a response received from the AP using the wireless medium, the response indicating that the non-AP STA is a sensing receiver or transmitter (e.g., as part of a negotiation phase).

At block 708, the device may identify a trigger frame received from the AP to facilitate the P2P Wi-Fi sensing operations. The trigger frame may be the first of multiple trigger frames respectively addressed to an individual non-AP STA, the individual non-AP STA triggered by the trigger frame to send a sensing PPDU to the device for CSI measurements. Alternatively, the trigger frame may be sent to any non-AP STAs in a BSS to simultaneously trigger the non-AP STAs to send respective sensing PPDUs.

At block 710, the device may receive one or more sensing PPDUs from one or more STAs in the same or another BSS (e.g., a BSS of a second AP). The sensing PPDUs may identify the sending devices for the P2P Wi-Fi sensing operations.

At block 712, the device may determine CSI based on the one or more sensing PPDUs.

It is understood that the above descriptions are for purposes of illustration and are not meant to be limiting.

Figure 7B:
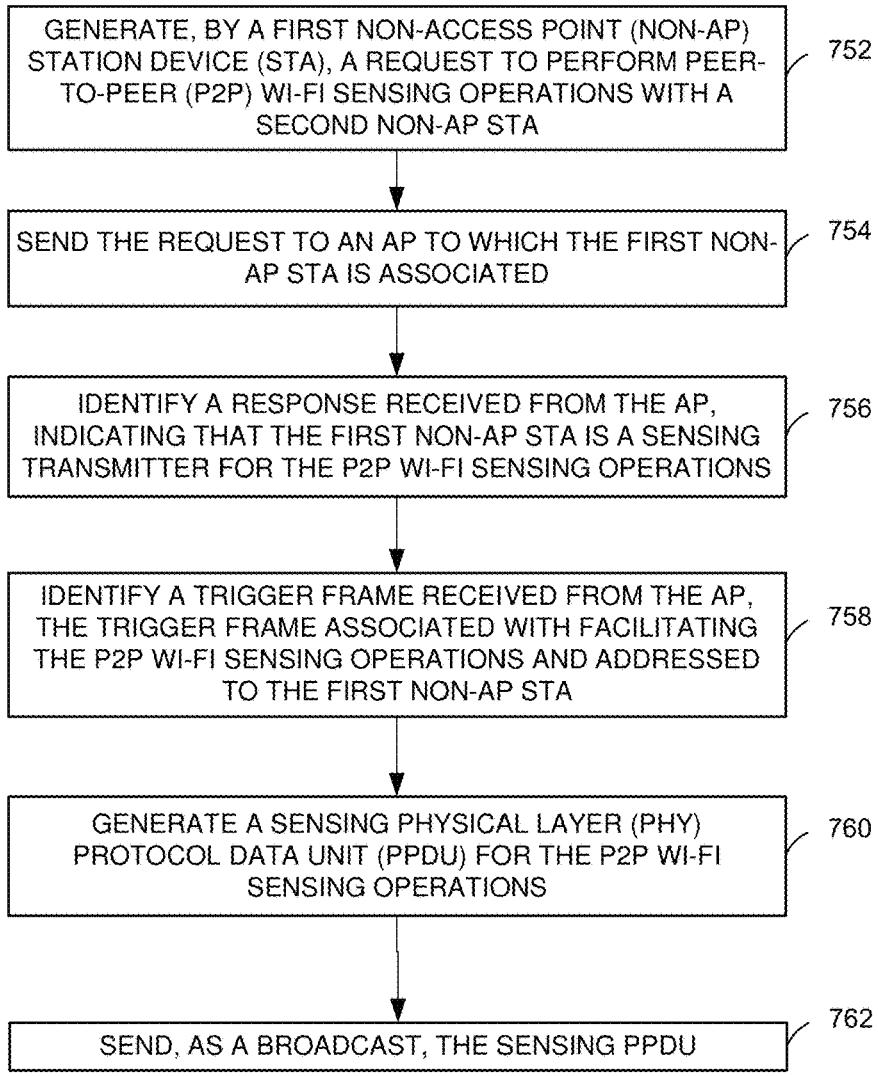
FIG. 7B illustrates a flow diagram of illustrative process for Wi-Fi P2P operations, in accordance with one or more example embodiments of the present disclosure.

FIG. 7B illustrates a flow diagram of illustrative process 750 for Wi-Fi P2P operations, in accordance with one or more example embodiments of the present disclosure.

At block 752, a device (e.g., the user device(s) 120 of FIG. 1, the STAs 1-4 of FIG. 2, the STA 304 of FIGS. 3 and 4) may generate a request to perform P2P Wi-Fi operations with a another non-AP STA.

At block 754, the device may send the request to an AP to which the device is associated (e.g., via a BSS). The request may be sent using a wireless medium.

At block 756, the device may identify a response received from the AP using the wireless medium, the response indicating that the non-AP STA is a sensing receiver or transmitter (e.g., as part of a negotiation phase).

At block 758, the device may identify a trigger frame received from the AP to facilitate the P2P Wi-Fi sensing operations. The trigger frame may be the first of multiple trigger frames respectively addressed to the device.

At block 760, the device may generate a sensing PPDU including an indicating that the device is the sender of the sensing PPDU.

At block 762, the device may send the sensing PPDU as a broadcast (e.g., to multiple non-AP STAs) to allow the other non-AP STAs to determine CSI for the P2P Wi-Fi sensing operations.

It is understood that the above descriptions are for purposes of illustration and are not meant to be limiting.

FIG. 8 shows a functional diagram of an exemplary communication station 800, in accordance with one or more example embodiments of the present disclosure. In one embodiment, FIG. 8 illustrates a functional block diagram of a communication station that may be suitable for use as an AP 102 (FIG. XX) or a user device 120 (FIG. XX) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a Wi-Fi P2P sensing device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 902 for generation and processing of the baseband signals and for controlling operations of the main memory 904, the storage device 916, and/or the Wi-Fi P2P sensing device 919. The baseband processor may be provided on a single radio card, a single chip, or an integrated circuit (IC).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The Wi-Fi P2P sensing device 919 may carry out or perform any of the operations and processes (e.g., processes 700 and 750) described and shown above.

It is understood that the above are only a subset of what the Wi-Fi P2P sensing device 919 may be configured to perform and that other functions included throughout this disclosure may also be performed by the Wi-Fi P2P sensing device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 10:
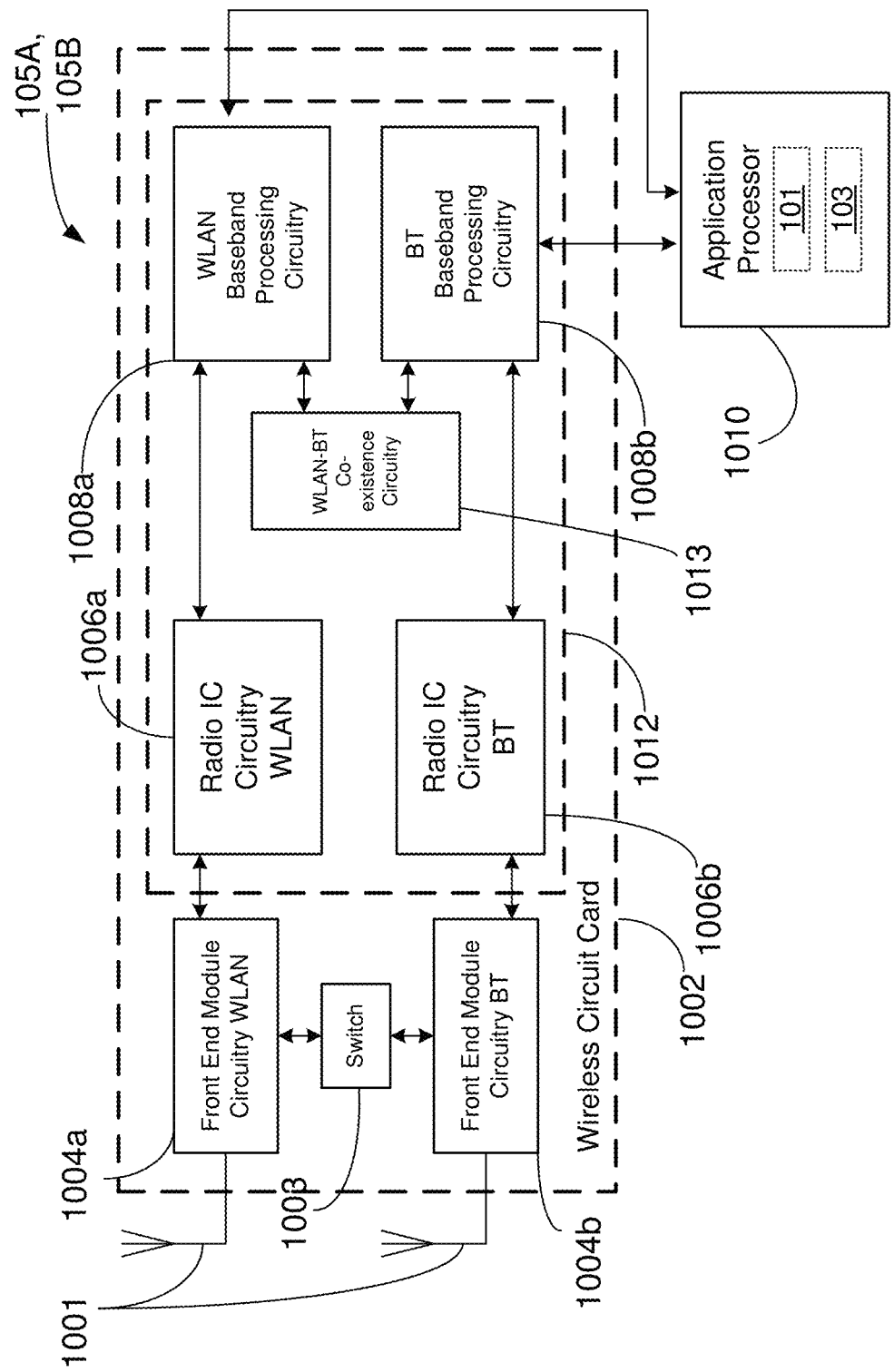
FIG. 10 is a block diagram of a radio architecture in accordance with some examples.

FIG. 10 is a block diagram of a radio architecture 105A, 105B in accordance with some embodiments that may be implemented in any one of the example APs 102 and/or the example user devices 120 of FIG. 1. Radio architecture 105A, 105B may include radio front-end module (FEM) circuitry 1004a-b, radio IC circuitry 1006a-b and baseband processing circuitry 1008a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a-b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a-b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008a-b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a-b, and to also generate corresponding WLAN or BT baseband signals for the transmit signal path of the radio IC circuitry 1006a-b. Each of the baseband processing circuitries 1008a and 1008b may further include physical layer (PHY) and medium access control layer (MAC) circuitry, and may further interface with a device for generation and processing of the baseband signals and for controlling operations of the radio IC circuitry 1006a-b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004a-b, the radio IC circuitry 1006a-b, and baseband processing circuitry 1008a-b may be provided on a single radio card, such as wireless radio card 1002. In some other embodiments, the one or more antennas 1001, the FEM circuitry 1004*a*-*b* and the radio IC circuitry 1006*a*-*b* may be provided on a single radio card. In some other embodiments, the radio IC circuitry 1006*a*-*b* and the baseband processing circuitry 1008*a*-*b* may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 10, the BT baseband circuitry 1008*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
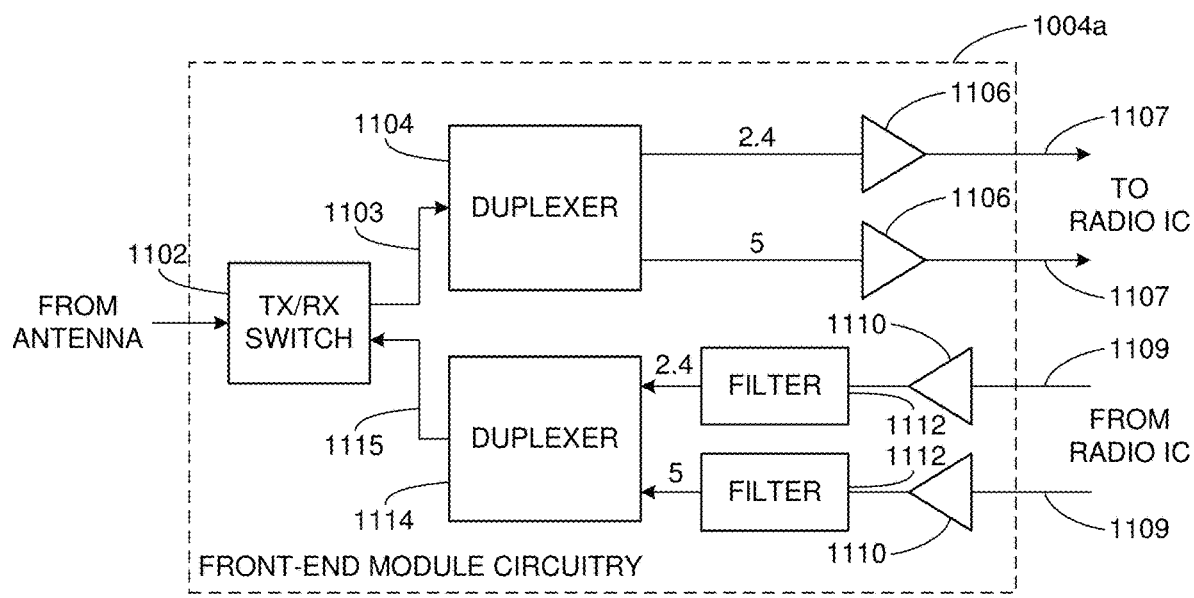
FIG. 11 illustrates an example front-end module circuitry for use in the radio architecture of FIG. 10, in accordance with one or more example embodiments of the present disclosure.

FIG. 11 illustrates WLAN FEM circuitry 1104*a* in accordance with some embodiments. Although the example of FIG. 11 is described in conjunction with the WLAN FEM circuitry 1104*a*, the example of FIG. 11 may be described in conjunction with the example BT FEM circuitry 1104*b* (FIG. 11), although other circuitry configurations may also be suitable.

In some embodiments, the FEM circuitry 1104*a* may include a TX/RX switch 1102 to switch between transmit mode and receive mode operation. The FEM circuitry 1104*a* may include a receive signal path and a transmit signal path. The receive signal path of the FEM circuitry 1104*a* may include a low-noise amplifier (LNA) 1106 to amplify received RF signals 1103 and provide the amplified received RF signals 1107 as an output (e.g., to the radio IC circuitry 1106*a*-*b* (FIG. 11)). The transmit signal path of the circuitry 1104*a* may include a power amplifier (PA) to amplify input RF signals 1109 (e.g., provided by the radio IC circuitry 1106*a*-*b*), and one or more filters 1112, such as band-pass filters (BPFs), low-pass filters (LPFs) or other types of filters, to generate RF signals 1115 for subsequent transmission (e.g., by one or more of the antennas 1101 (FIG. 11)) via an example duplexer 1114.

In some dual-mode embodiments for Wi-Fi communication, the FEM circuitry 1104*a* may be configured to operate in either the 2.4 GHz frequency spectrum or the 5 GHz frequency spectrum. In these embodiments, the receive signal path of the FEM circuitry 1104*a* may include a receive signal path duplexer 1104 to separate the signals from each spectrum as well as provide a separate LNA 1106 for each spectrum as shown. In these embodiments, the transmit signal path of the FEM circuitry 1104*a* may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1101 (FIG. 11). In some embodiments, BT communications may utilize the 2.4 GHz signal paths and may utilize the same FEM circuitry 1104*a* as the one used for WLAN communications.

Figure 12:
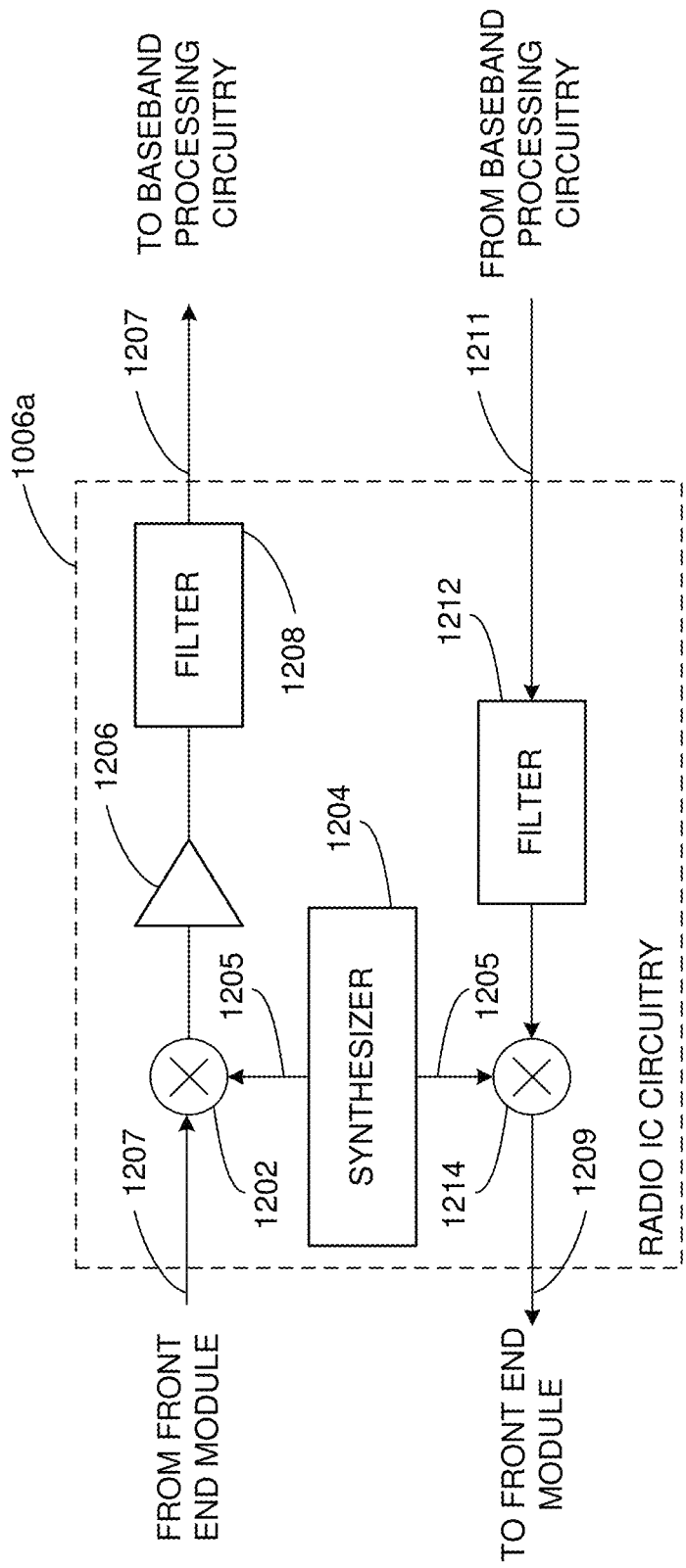
FIG. 12 illustrates an example radio IC circuitry for use in the radio architecture of FIG. 10, in accordance with one or more example embodiments of the present disclosure.

FIG. 12 illustrates radio IC circuitry 1006*a* in accordance with some embodiments. The radio IC circuitry 1006*a* is one example of circuitry that may be suitable for use as the WLAN or BT radio IC circuitry 1006*a*/1006*b* (FIG. 10), although other circuitry configurations may also be suitable. Alternatively, the example of FIG. 12 may be described in conjunction with the example BT radio IC circuitry 1006*b*.

In some embodiments, the radio IC circuitry 1006*a* may include a receive signal path and a transmit signal path. The receive signal path of the radio IC circuitry 1006*a* may include at least mixer circuitry 1202, such as, for example, down-conversion mixer circuitry, amplifier circuitry 1206 and filter circuitry 1208. The transmit signal path of the radio IC circuitry 1006*a* may include at least filter circuitry 1212 and mixer circuitry 1214, such as, for example, upconversion mixer circuitry. Radio IC circuitry 1006*a* may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004*a-b* (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008*a-b* (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004*a-b*. The baseband signals 1211 may be provided by the baseband processing circuitry 1008*a-b* and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or upconversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct upconversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1204 may be provided by a voltage controlled oscillator (VCO), although that is not a requirement. A divider control input may further be provided by either the baseband processing circuitry 1008*a-b* (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example secure signal converter 101 or the example received signal converter 103 (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
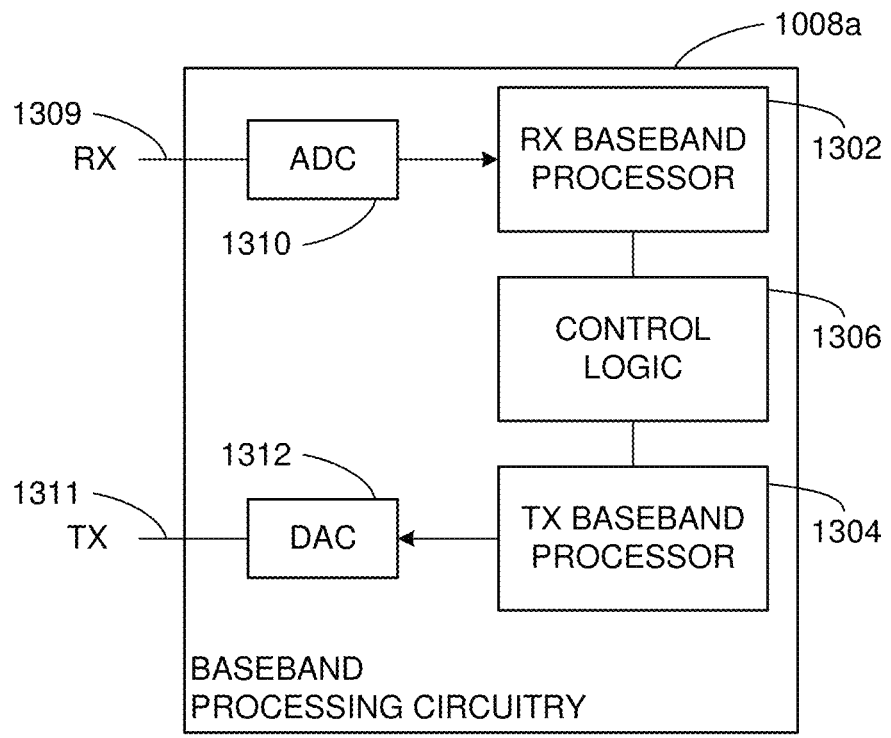
FIG. 13 illustrates an example baseband processing circuitry for use in the radio architecture of FIG. 10, in accordance with one or more example embodiments of the present disclosure.

FIG. 13 illustrates a functional block diagram of baseband processing circuitry 1008*a* in accordance with some embodiments. The baseband processing circuitry 1008*a* is one example of circuitry that may be suitable for use as the baseband processing circuitry 1008*a* (FIG. 10), although other circuitry configurations may also be suitable. Alternatively, the example of FIG. 12 may be used to implement the example BT baseband processing circuitry 1008*b* of FIG. 10.

The baseband processing circuitry 1008*a* may include a receive baseband processor (RX BBP) 1302 for processing receive baseband signals 1209 provided by the radio IC circuitry 1006*a-b* (FIG. 10) and a transmit baseband processor (TX BBP) 1304 for generating transmit baseband signals 1211 for the radio IC circuitry 1006*a-b*. The baseband processing circuitry 1008*a* may also include control logic 1306 for coordinating the operations of the baseband processing circuitry 1008*a*.

In some embodiments (e.g., when analog baseband signals are exchanged between the baseband processing circuitry 1008*a-b* and the radio IC circuitry 1006*a-b*), the baseband processing circuitry 1008*a* may include ADC 1310 to convert analog baseband signals 1309 received from the radio IC circuitry 1006*a-b* to digital baseband signals for processing by the RX BBP 1302. In these embodiments, the baseband processing circuitry 1008*a* may also include DAC 1312 to convert digital baseband signals from the TX BBP 1304 to analog baseband signals 1311.

In some embodiments that communicate OFDM signals or OFDMA signals, such as through baseband processor 1008*a*, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V)

device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following are example aspects that are not meant to be exclusive.

Example 1 may be an apparatus of a non-AP STA device, the apparatus comprising memory and processing circuitry configured to: generate a request to perform peer-to-peer (P2P) Wi-Fi sensing operations with a second non-AP STA; send the request, using a wireless medium, to an AP to which the non-AP STA is associated; identify a response received from the AP using the wireless medium, the response indicating that the non-AP STA is a sensing receiver for the P2P Wi-Fi sensing operations; identify a trigger frame received from the AP, the trigger frame associated with the P2P Wi-Fi sensing operations; identify a sensing physical layer (PHY) protocol data unit (PPDU) received from the second non-AP STA, the sensing PPDU associated with the P2P Wi-Fi sensing operations and comprising an indication that the second non-AP STA sent the sensing PPDU; and determine channel state information based on the sensing PPDU, the channel state information indicative of motion of people or objects.

Example 2 may include the apparatus of example 1 and/or some other example herein, wherein the second non-AP STA is associated to the AP.

Example 3 may include the apparatus of example 1 and/or some other example herein, wherein the second non-AP STA is associated to a second AP different than the AP.

Example 4 may include the apparatus of example 1 and/or some other example herein, wherein the trigger frame is further associated with causing the second non-AP STA to send the sensing PPDU and with causing a third non-AP STA to send a second sensing PPDU comprising an indication that the third non-AP STA sent the second sensing PPDU.

Example 5 may include the apparatus of example 1 and/or some other example herein, wherein the trigger frame is a first trigger frame addressed to the second non-AP STA, and wherein the processing circuitry is further configured to: identify a second trigger frame received from the AP, the second trigger frame associated with the P2P Wi-Fi sensing operations and addressed to a third non-AP STA; and identify a second sensing PPDU received from the third non-AP STA, the second sensing PPDU comprising an indication that the third non-AP STA sent the second sensing PPDU, wherein the channel state information is further based on the second sensing PPDU.

Example 6 may include the apparatus of example 1 and/or some other example herein, wherein the trigger frame is a ranging trigger frame that comprises a bit in a ranging trigger subtype field, the bit indicating that the trigger frame is a sensing trigger frame variant.

Example 7 may include the apparatus of example 1 and/or some other example herein, wherein the trigger frame comprises a trigger type subfield value in a trigger dependent common information field, the trigger type subfield value indicating that the trigger frame is a sensing trigger frame.

Example 8 may include the apparatus of example 1 and/or some other example herein, further comprising a transceiver configured to transmit and receive wireless signals comprising the trigger frame and the sensing PPDU.

Example 9 may include the device of example 8 and/or some other example herein, further comprising one or more antennas coupled to the transceiver to receive the trigger frame and the sensing PPDU.

Example 10 may include a non-transitory computer-readable medium storing computer-executable instructions which when executed by one or more processors result in performing operations comprising: generating, by a first non-access point (non-AP) station device (STA), a request to perform peer-to-peer (P2P) Wi-Fi sensing operations with a second non-AP STA; sending the request, using a wireless medium, to an AP to which the first non-AP STA is associated; identify a response received from the AP using the wireless medium, the response indicating that the first non-AP STA is a sensing transmitter for the P2P Wi-Fi sensing operations; identify a trigger frame received from the AP, the trigger frame associated with the P2P Wi-Fi sensing operations and addressed to the first non-AP STA; generate a sensing physical layer (PHY) protocol data unit (PPDU) associated with the P2P Wi-Fi sensing operations, the sensing PPDU comprising an indication that the first non-AP STA sent the sensing PPDU; and send, as a broadcast to at least the second non-AP STA, the sensing PPDU, wherein the sensing PPDU is associated with channel state information indicative of motion of people or objects.

Example 11 may include the non-transitory computer-readable medium of example 10 and/or some other example herein, wherein the second non-AP STA is associated to the AP.

Example 12 may include the non-transitory computer-readable medium of example 10 and/or some other example herein, wherein the second non-AP STA is associated to a second AP different than the AP.

Example 13 may include the non-transitory computer-readable medium of example 10 and/or some other example herein, wherein the trigger frame is further associated with causing the second non-AP STA to send the sensing PPDU and with causing a third non-AP STA to send a second sensing PPDU comprising an indication that the third non-AP STA sent the second sensing PPDU.

Example 14 may include the non-transitory computer-readable medium of example 10 and/or some other example herein, wherein the trigger frame is a ranging trigger frame that comprises a bit in a ranging trigger subtype field, the bit indicating that the trigger frame is a sensing trigger frame variant.

Example 15 may include the non-transitory computer-readable medium of example 10 and/or some other example herein, wherein the trigger frame comprises a trigger type subfield value in a trigger dependent common information field, the trigger type subfield value indicating that the trigger frame is a sensing trigger frame.

Example 16 may include the non-transitory computer-readable medium of example 10 and/or some other example herein, the operations further comprising: identifying a second trigger frame received from the AP, the second trigger frame associated with causing the second non-AP STA to send feedback associated with the channel state information; identifying the feedback received from the AP; and determining the channel state information based on the feedback.

Example 17 may include the non-transitory computer-readable medium of example 10 and/or some other example herein, the operations further comprising: identifying a second trigger frame received from the AP, the second trigger frame associated with causing the second non-AP STA to send feedback associated with the channel state information; identifying the feedback received from the second non-AP STA; and determining the channel state information based on the feedback.

Example 18 may include a method comprising: generating, by processing circuitry of a first non-access point (non-AP) station device (STA), a request to perform peer-to-peer (P2P) Wi-Fi sensing operations with a second non-AP STA; sending, by the processing circuitry, the request, using a wireless medium, to an AP to which the first non-AP STA is associated; identifying, by the processing circuitry, a response received from the AP using the wireless medium, the response indicating that the first non-AP STA is a sensing receiver for the P2P Wi-Fi sensing operations; identifying, by the processing circuitry, a trigger frame received from the AP, the trigger frame associated with the P2P Wi-Fi sensing operations; identifying, by the processing circuitry, a sensing physical layer (PHY) protocol data unit (PPDU) received from the second non-AP STA, the sensing PPDU associated with the P2P Wi-Fi sensing operations and comprising an indication that the second non-AP STA sent the sensing PPDU; and determining, by the processing circuitry, channel state information based on the sensing PPDU, the channel state information indicative of motion of people or objects.

Example 19 may include the method of example 18 and/or some other example herein, wherein the second non-AP STA is associated to the AP.

Example, 20 may include the method of example 18 and/or some other example herein, wherein the second non-AP STA is associated to the AP.

Example 21 may include one or more non-transitory computer-readable media comprising instructions to cause an electronic device, upon execution of the instructions by one or more processors of the electronic device, to perform one or more elements of a method de scribed in or related to any of examples 1-20, or any other method or process described herein Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus of a non-access point (non-AP) station device (STA), the apparatus comprising processing circuitry coupled to storage, the processing circuitry configured to:
   generate a request for an AP, to which the non-AP is associated, to establish peer-to-peer (P2P) Wi-Fi sensing operations between the non-AP STA and a second non-AP STA;
   send the request, using a wireless medium, to the AP;
   identify a response received from the AP using the wireless medium, the response indicating that the non-AP STA is a sensing receiver for the P2P Wi-Fi sensing operations;
   identify a trigger frame received from the AP, the trigger frame associated with causing the second non-AP STA to send a sensing physical layer (PHY) protocol data unit (PPDU) to the non-AP STA for the P2P Wi-Fi sensing operations;
   identify the sensing PPDU received from the second non-AP STA, the sensing PPDU comprising an indication that the second non-AP STA sent the sensing PPDU; and
   determine channel state information based on the sensing PPDU, the channel state information indicative of motion of people or objects.

2. The apparatus of claim 1, wherein the second non-AP STA is associated to the AP.

3. The apparatus of claim 1, wherein the second non-AP STA is associated to a second AP different than the AP.

4. The apparatus of claim 1, wherein the trigger frame is further associated with causing the second non-AP STA to send the sensing PPDU and with causing a third non-AP STA to send a second sensing PPDU comprising an indication that the third non-AP STA sent the second sensing PPDU.

5. The apparatus of claim 1, wherein the trigger frame is a first trigger frame addressed to the second non-AP STA, and wherein the processing circuitry is further configured to:
   identify a second trigger frame received from the AP, the second trigger frame associated with the P2P Wi-Fi sensing operations and addressed to a third non-AP STA; and
   identify a second sensing PPDU received from the third non-AP STA, the second sensing PPDU comprising an indication that the third non-AP STA sent the second sensing PPDU,
   wherein the channel state information is further based on the second sensing PPDU.

6. The apparatus of claim 1, wherein the trigger frame is a ranging trigger frame that comprises a bit in a ranging trigger subtype field, the bit indicating that the trigger frame is a sensing trigger frame variant.

7. The apparatus of claim 1, wherein the trigger frame comprises a trigger type subfield value in a trigger dependent common information field, the trigger type subfield value indicating that the trigger frame is a sensing trigger frame.

8. The apparatus of claim 1, further comprising a transceiver configured to transmit and receive wireless signals comprising the trigger frame and the sensing PPDU.

9. The apparatus of claim 8, further comprising an antenna coupled to the transceiver to receive the trigger frame and the sensing PPDU.

10. A non-transitory computer-readable medium storing computer-executable instructions which when executed by one or more processors result in performing operations comprising:
   generating, by a first non-access point (non-AP) station device (STA), a request for an AP, to which the non-AP is associated, to establish peer-to-peer (P2P) Wi-Fi sensing operations between the non-AP STA and a second non-AP STA;
   sending the request, using a wireless medium, to the AP;

identify a response received from the AP using the wireless medium, the response indicating that the first non-AP STA is a sensing transmitter for the P2P Wi-Fi sensing operations;

identify a trigger frame received from the AP, the trigger frame associated with the P2P Wi-Fi sensing operations and addressed to the first non-AP STA;

generate a sensing physical layer (PHY) protocol data unit (PPDU) associated with the P2P Wi-Fi sensing operations, the sensing PPDU comprising an indication that the first non-AP STA sent the sensing PPDU; and send, as a broadcast to at least the second non-AP STA, the sensing PPDU, wherein the sensing PPDU is associated with channel state information indicative of motion of people or objects.

11. The non-transitory computer-readable medium of claim 10, wherein the second non-AP STA is associated to the AP.

12. The non-transitory computer-readable medium of claim 10, wherein the second non-AP STA is associated to a second AP different than the AP.

13. The non-transitory computer-readable medium of claim 10, wherein the trigger frame is further associated with causing the second non-AP STA to send the sensing PPDU and with causing a third non-AP STA to send a second sensing PPDU comprising an indication that the third non-AP STA sent the second sensing PPDU.

14. The non-transitory computer-readable medium of claim 10, wherein the trigger frame is a ranging trigger frame that comprises a bit in a ranging trigger subtype field, the bit indicating that the trigger frame is a sensing trigger frame variant.

15. The non-transitory computer-readable medium of claim 10, wherein the trigger frame comprises a trigger type subfield value in a trigger dependent common information field, the trigger type subfield value indicating that the trigger frame is a sensing trigger frame.

16. The non-transitory computer-readable medium of claim 10, the operations further comprising:

identifying a second trigger frame received from the AP, the second trigger frame associated with causing the second non-AP STA to send feedback associated with the channel state information;

identifying the feedback received from the AP; and determining the channel state information based on the feedback.

17. The non-transitory computer-readable medium of claim 10, the operations further comprising:

identifying a second trigger frame received from the AP, the second trigger frame associated with causing the second non-AP STA to send feedback associated with the channel state information;

identifying the feedback received from the second non-AP STA; and determining the channel state information based on the feedback.

18. A method comprising:

generating, by processing circuitry of a first non-access point (non-AP) station device (STA), a request for an AP, to which the non-AP is associated, to establish peer-to-peer (P2P) Wi-Fi sensing operations between the non-AP STA and a second non-AP STA;

sending, by the processing circuitry, the request, using a wireless medium, to the AP;

identifying, by the processing circuitry, a response received from the AP using the wireless medium, the response indicating that the first non-AP STA is a sensing receiver for the P2P Wi-Fi sensing operations;

identifying, by the processing circuitry, a trigger frame received from the AP, the trigger frame associated with the P2P Wi-Fi sensing operations;

identifying, by the processing circuitry, a sensing physical layer (PHY) protocol data unit (PPDU) received from the second non-AP STA, the sensing PPDU associated with the P2P Wi-Fi sensing operations and comprising an indication that the second non-AP STA sent the sensing PPDU; and determining, by the processing circuitry, channel state information based on the sensing PPDU, the channel state information indicative of motion of people or objects.

19. The method of claim 18, wherein the second non-AP STA is associated to the AP.

20. The method of claim 18, wherein the second non-AP STA is associated to a second AP different than the AP.

* * * * *